United States Patent [19]

Kobayakawa

[11] Patent Number: 5,324,122
[45] Date of Patent: Jun. 28, 1994

[54] PAGE PRINTER CAPABLE OF CHANGING PAGE SIZE

[75] Inventor: Koji Kobayakawa, Ichinomiya, Japan

[73] Assignee: Brother Kogyo Kabushiki Kaisha, Nagoya, Japan

[21] Appl. No.: 928,666

[22] Filed: Aug. 17, 1992

Related U.S. Application Data

[63] Continuation of Ser. No. 565,681, Aug. 10, 1990, abandoned.

[30] Foreign Application Priority Data

Aug. 28, 1989 [JP] Japan .................................. 1-220972

[51] Int. Cl.$^5$ ............................................. B41J 02/00
[52] U.S. Cl. .................................... 400/121; 395/116; 395/102
[58] Field of Search ................ 400/121; 395/102, 115, 395/139, 116

[56] References Cited

U.S. PATENT DOCUMENTS

| | | | |
|---|---|---|---|
| 4,342,052 | 7/1982 | Rackley | 358/451 |
| 4,555,191 | 11/1985 | Gojo | 400/121 |
| 4,630,947 | 12/1986 | Yoshida | 400/76 |
| 4,673,956 | 6/1987 | Kobayashi | 346/160 |
| 4,707,153 | 11/1987 | Nishi | 400/76 |

FOREIGN PATENT DOCUMENTS

| | | | |
|---|---|---|---|
| 150570 | 7/1986 | Japan | 400/121 |
| 280944 | 12/1986 | Japan | 400/121 |
| 80550 | 3/1989 | Japan | 400/121 |

*Primary Examiner*—David A. Wiecking
*Assistant Examiner*—Steven S. Kelley
*Attorney, Agent, or Firm*—Oliff & Berridge

[57] ABSTRACT

Data input from a host computer to a printer are stored in a first memory as page data. There can be set up an edit mode in which the data input from the host computer to the printer are edited and printed in the number of pages different from the number of pages which the data has had when the data is input. When this edit mode is set up, page data in the first memory is enlarged or contracted and edited in new page data. The new page data is stored in a second memory. The page data stored in the second memory is printed out by a printing mechanism in the printer.

18 Claims, 4 Drawing Sheets

PAGE PRINTER CAPABLE OF CHANGING PAGE SIZE

This is a continuation of application Ser. No. 07/565,681 filed Aug. 10, 1900, now abandoned.

BACKGROUND OF THE INVENTION

1. Field of the Invention

This invention relates to a printer having an edit function which carries out enlargement or reduction for each page.

2. Discussion of Related Art

There have been conventionally adopted the following two methods in the case where contents of a plurality of pages are summarized and reduced to print them in one page, or contents of one page are enlarged to divide and print them in a plurality of pages. The first method is one in which contents are edited in accompaniment with reduction or enlargement so that the contents are brought into a desirable page constitution in a host computer in advance, and page data after the edit are input into a printer to carry out printing. The second method is one in which contents of a plurality of pages are first printed as usual by a printer, and thereafter a plurality of printed documents are joined together to carry out duplication in accompaniment with reduction, using a copying machine or carry out duplication in accompaniment with enlargement for a desirable page, and thereafter the documents are clipped to a desirable size and divided.

However, in the first method, it is necessary to prepare the above-mentioned edit function with a host computer. Moreover, the host computer is burdened heavily in terms of processing time. Furthermore, when data are transferred from the host computer to a printer, the transfer has been carried out based on a down-load system in which bit pattern data corresponding to each print image element are transferred. Accordingly, an amount of data to be transferred has been voluminous. Consequently, the transfer time for data becomes long, and the host computer is burdened heavily too.

Also, in the second method, a paper which has been once printed is subjected to manual processing, and then must undergo duplication. Consequently, it is a serious problem that not only a lot of time and labor is imposed on an operator, but also the picture quality of the printed matter is deteriorated by duplication.

SUMMARY OF THE INVENTION

An object of the present invention is to provide a printer having an edit function which carries out enlargement or reduction for each page without imposing any burden on a host computer.

Another object of the present invention is to provide a printer having a function which edits input contents so as to put the input contents in the desirable number of pages different from that of pages thereof for printing.

A further object of the present invention is to provide a printer having such an edit function that after contents are enlarged for each page, they are divided into a plurality of pages for printing.

A still further object of the present invention is to provide a printer having such an edit function that contents of a plurality of pages are summarized and reduced, and then printed in the same page.

In order to achieve such objects, a printer with an edit function according to the present invention comprises a first memory which stores data from a host computer as page data, an edit mode set-up means in which contents are edited into the number of pages different from that of pages of input data and then printed, an editing means which enlarges or reduces page data in the first memory and edits in new page data for each page when the edit mode is set up, a second memory which stores the new data and a printing means which prints page data in the second memory.

In the page printer with an edit function having a constitution according to the present invention, when the edit mode is set up by the edit mode set-up means, the editing means enlarges or reduces page data in the first memory, edits new page data for each page from them, and then stores the new page data in the second memory. The new page data are printed by the printing means. In this way, in the printer related to the present invention, input contents can be edited into new page data by enlargement or reduction within the printer and printed without depending on the host computer. Accordingly, an operator can easily obtain printed matter based on page data applied with a desirable edit through simple operation without imposing the burden on the host computer.

BRIEF DESCRIPTION OF THE DRAWINGS

A preferred embodiment of the present invention will be described in detail with reference to the following figures wherein.

DETAILED DESCRIPTION OF THE PREFERRED EMBODIMENT

Hereinafter, an embodiment which embodies a page printer with an edit function according to the present invention will be described with reference to drawings.

Figure 1:
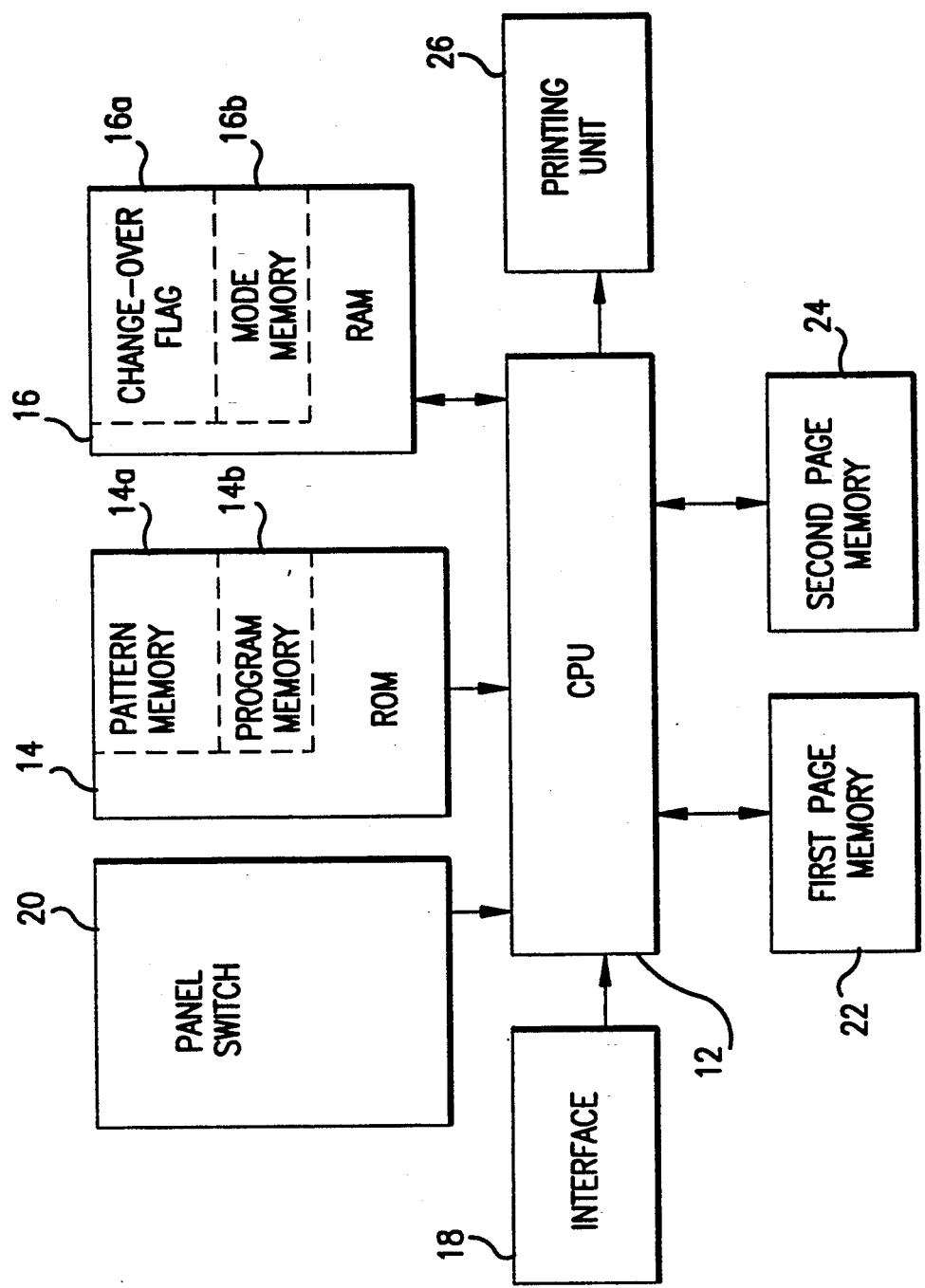
FIG. 1 is a block diagram showing a printer which embodies the present invention.

FIG. 1 is a block diagram showing a constitution of the present printer. The present printer is provided with a CPU 12 which controls the whole of the printer, a ROM 14 operating as a pattern memory 14a which stores a plurality of character patterns, a program memory 14b which stores an operating program and other required data, a RAM 16 operating as a change-over flag 16a which is set when a change-over command for changing over a mode to a mode different from a mode set up at present is input thereto, a mode memory 16b which stores the set-up mode and other required data, an interface 18 which is connected to a host computer to receive data, a panel switch 20 which carries out change-over of a mode described later and other required operations, a first page memory 22 stores, as first page data, bit pattern data for one page developed from input data based on the character pattern in the pattern memory 14a, a second page memory 24 which stores, as second data, data comprising new bit pattern data for one page edited from the first page data at the time of an enlargement mode and a contraction mode both described later, a printing unit 26 which carries out printing with the resolution of 300 dpi (dots/inch) for each page using a laser printing system or other suitable printing system.

Printing contents in each page are input in a batch for each page into a printer through the interface 18 from the host computer in the form of character codes or vector data. A page end command is added to the end of each page.

The present printer is provided with a reduction mode in which input data for several pages, for example four pages, are reduced and printed in one page and an enlargement mode in which input data for one page are enlarged, and divided and printed in several pages, for example four pages, as edit functions besides a standard mode in which input data from the host computer are printed according to the page form. The change-over of the mode can be carried out by a mode change-over command from the host computer or a mode change-over command generated by the operation of the panel switch 20.

Figure 2:
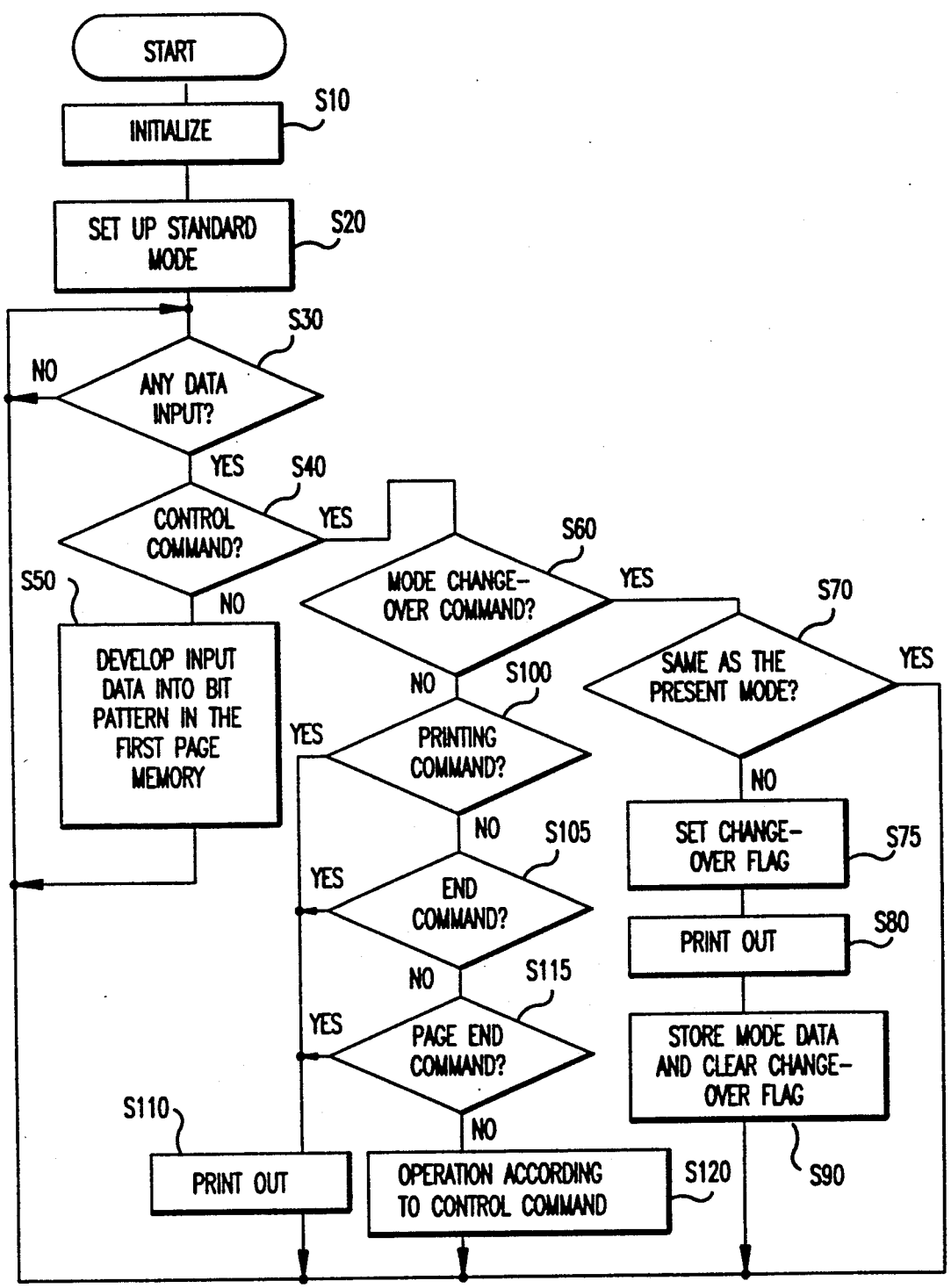
FIG. 2 and FIG. 3 are flowcharts showing operations of this printer.

Next, the operation of the present printer constituted as described above will be described. FIG. 2 is a flowchart showing the operation of the present printer. At first, upon turning on a power supply, at the step S10 (Hereinafter it is abbreviated as S10, and other steps are similarly abbreviated.), an initial set-up of the printer is carried out. At S20, the standard mode is set up. Next, at S30, the printer enters into a reception data waiting state. Data is sent to the CPU 12 through the interface 18 from the host computer, and at S30, it is determined that the data is input. At S40, it is judged whether or not the data is a control command. When the data is not the control command, that is, when the data is printed data of characters and figures, at S50, the printed data is developed into a bit pattern based on the pattern data in the pattern memory 14a and stored in the first page memory 22. Then, the process returns to S30.

When the data is determined to be a control command at S40, it is judged at S60 whether or not the data is a mode change-over command. When the data is a mode change-over command, it is judged at S70 whether or not a mode specified by the mode change-over command is the same as the present mode. When both modes are the same, the mode change-over command is regarded to be invalid and the process returns to S30. When both modes are different from each other, the change-over flag 16a is set at S75. Next, at S80, the page data stored at present in accordance with the present mode, that is, the data in the first page memory 22 or the second page memory 24 is printed out by the printing unit 26. The detail of the printed-out output will be described later. Data showing a mode after changing-over are stored in the mode memory 16b of the RAM 16 at S90, and at the same time, the change-over flag 16a is cleared, and the process returns to S30.

When it is determined that the data is not the change-over command at S60, it is judged at S100 whether or not the data is a printing command. When the data is a printing command, the process goes to S110, where a printing output is obtained, and the process returns to S30. When the input control command is not the printing command, the process goes to S105, where it is determined whether or not the input control command is an end command. When the input control command is the end command, the process goes to S110, where the printing output is obtained, and the process returns to S30. When it is determined that the input control command is not the end command at S105, the process goes to S115. At S115 it is determined whether or not the input control command is the page end command. When the input control command is the page end command, the process goes to S110. When the input control command is other than the mode change-over command, printing command, end command, and page end command, a processing in accordance with the control command is carried out at S120, and the process returns to S30.

Figure 3:
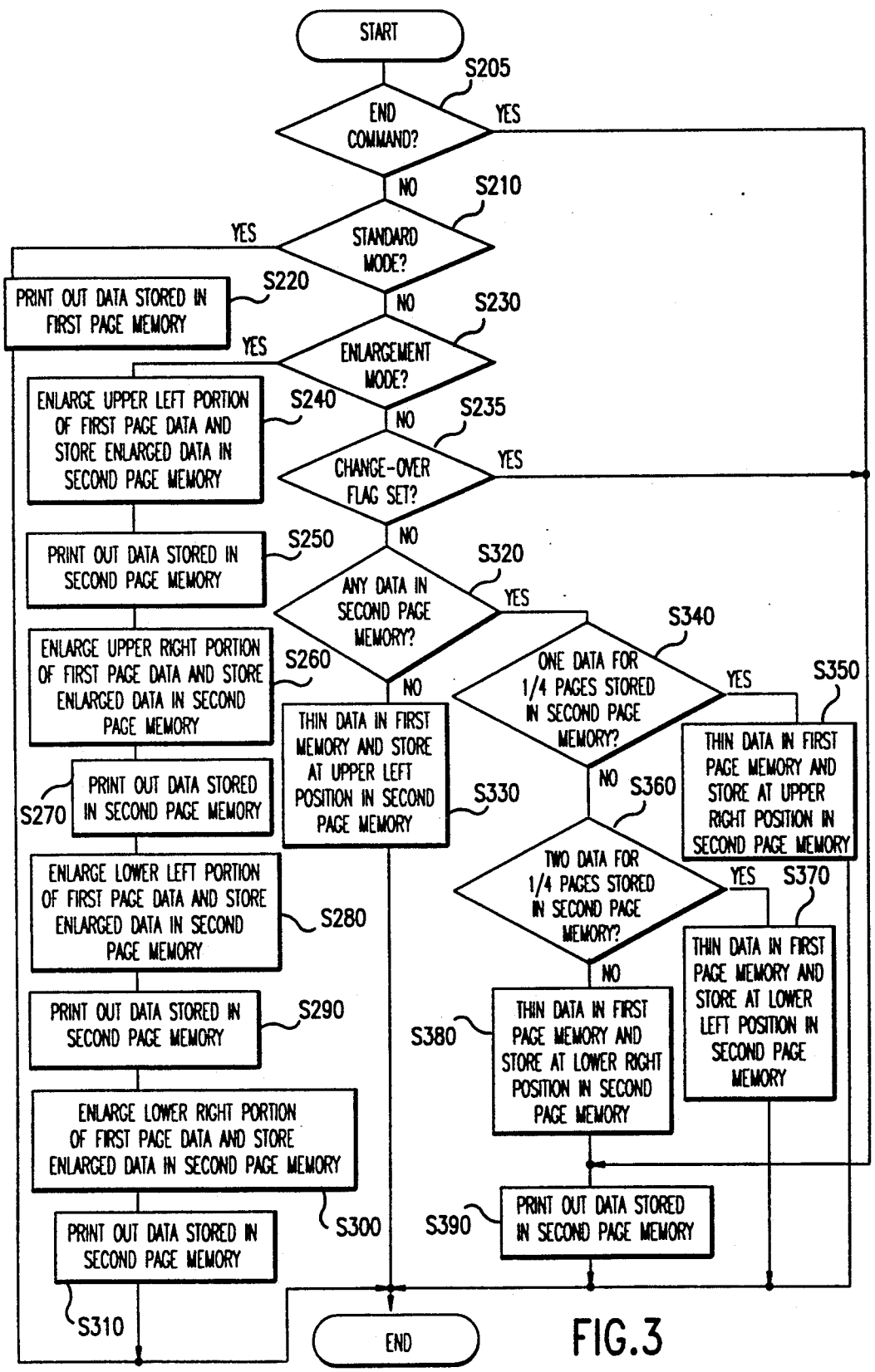

FIG. 3 is a flowchart showing the processing for printing output at S80 and S110. FIG. 4(a) to FIG. 4(d) are examples of printing for one page transferred to the first page memory from the host computer.

At first, it is determined at S205 whether or not the input control command is the end command. When the input control command is the end command, the process goes to S390, where contents stored at present in the second page memory 24 are printed out, and the present flow ends. When the input control command is not the end command, the process goes to S210, where it is judged whether or not the mode set up at present is a standard mode. When the mode set up at present is the standard mode, the data in the first page memory 22 are printed by the printing unit 26 as shown in FIG. 4 at S220, and the present flow ends.

Figure 4A:
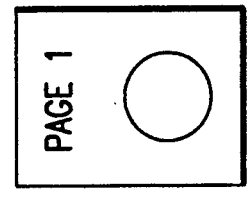
Figure 5B:
Figure 5A:
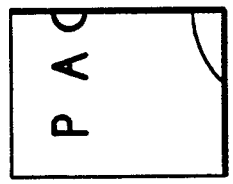
Figure 5D:
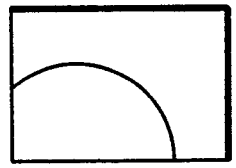
Figure 5C:
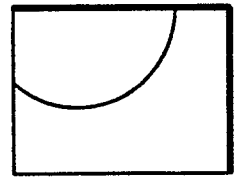

When the mode set up at present is not the standard mode, it is judged at S230 whether or not the mode is an enlargement mode. When the mode is the enlargement mode, at S240, first page data stored at present in the first page memory 22, data in the portion of a ¼ size of the upper left in the page data, for example, shown in FIG. 4(a) are enlarged into a size corresponding to one page and second page data shown in FIG. 5(a) are newly produced. Each bit in the portion of a ¼ size of the upper left in the first page data is converted into four bits composed of two longitudinal bits and two transversal bits, by which the enlargement is carried out. Next, at S250, contents of the second page memory 24 are transferred to the printing unit 26, where the portion of a ¼ size of the first page data is enlarged to a size corresponding to one page and printed out. Thereafter, at S250 to S310, the portion of a ¼ size of the upper right, that of the lower left and that of the lower right in the first page data are sequentially applied with the same processing as the above-mentioned processing at S240 and S250. By the processings at S240 to S310, for example, the first page data shown in FIG. 4(a) is enlarged both longitudinally and transversely by two times, divided into 4 pages shown in FIG. 5(a) to FIG. 5(d) to be printed out, and the present flow ends.

Figure 6:
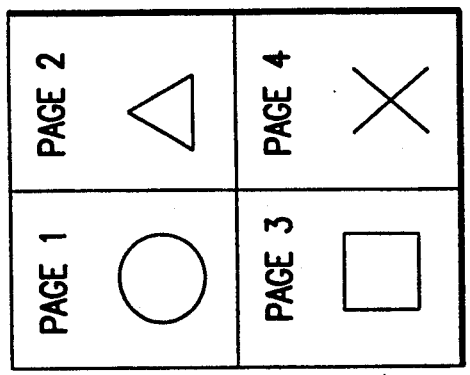
FIGS. 4a, 4b, 4c, 4d, 5a, 5b, 5c, 5d and FIG. 6 are diagrams showing print examples using this printer.

When it is determined at S230 that the mode set up at present is not the enlargement mode, that is, when the mode set up at present is a reduction mode, it is determined at S235 whether or not the change-over flag 16a is set. When the change-over flag 16a is set, the process goes to S390, where the contents stored at present in the second page memory 24 are printed out. When the change-over flag 16a is cleared, it is judged at S320 whether or not data is present in the second page memory 24, at S320, the first page data stored at present in the first page memory 22, for example, page data shown in FIG. 4(a) is reduced to ¼ in size and stored in the portion of a ¼ size of the upper left in the second page memory 24 as shown in FIG. 6. The first page data are thinned out by removing every other bit over the longitudinal and transversal directions, and thus the reduction is carried out. As another method in which data is reduced to ¼ in size, there is available a method in which every two bits in bit positions adjacent in the lateral direction are subjected to an OR operation, and then each two adjacent bits in the vertical direction are subjected to an OR operation to produce one new one bit. Also, there is available another method in which, when the number of bits showing printing among four bits adjacent in the lateral and vertical directions are not less than two, the bits are regarded to be one bit showing printing.

Figure 4B:
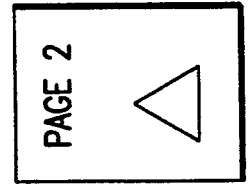

Next, when the mode change-over command is not input, and the next printing command is input as it is in the reduction mode, the process proceeds in the sequence of S30, S40, S60, S100, and S110 in FIG. 2. Further, the process proceeds in the sequence of S210, S230, and S320 in FIG. 3. As described above, when data is stored in the upper left quarter of the second page memory 24, it is determined at S320 that data is present in the second page memory 24, and the process proceeds to S340. It is determined at S340 whether or not data for the quarter page stored in the second page memory 24 is one. When the data for ¼ pages is one, the process proceeds to S350. Here, the contents stored at present in the first page memory 22 are reduced by the same processing as that at S330, and stored in the upper right quarter of the second page memory 24. For example, the page in the portion of a ¼ size in the lower right of the second page memory 24. For example, the data shown in FIG. 4(b) is contracted to ¼ and stored as shown in FIG. 6.

Figure 4C:
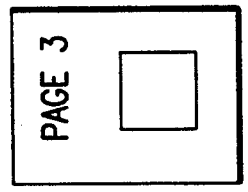

Next, when the mode change-over command is not input, and the next printing command is input as it is in the contraction mode, the determination at S340 is carried out through the same processing as described above. Here, when the data for ¼ pages stored in the second page memory 24 are two, the process proceeds to S370 through S360. Here, the contents stored at present in the first page memory 22 are reduced by the same processing as those at S330 and S350, and stored in the lower left quarter of the second page memory 24. For example, the page data shown in FIG. 4(c) is reduced by ¼ and stored as shown in FIG. 6.

Figure 4D:
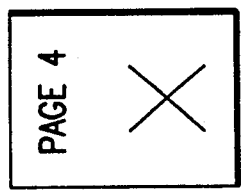

Next, when the mode change-over command is not input, and the next printing command is input as it is in the contraction mode, the determination at S360 is carried out through the same processing as that described above. Here, when the data for ¼ pages stored in the second page memory 24 are three, the process proceeds to S380. Here, the contents stored at present in the first page memory 22 are contracted by the same processing as those at S330, S350, and S370 and stored in the lower right quarter of the second page memory 24. For example, the data shown in FIG. 4(d) is contracted to ¼ and stored as shown in FIG. 6. The storage of the second page data for one page in the second page memory 24 is completed by these processings. When, in the reduction mode, the page data for 4 pages shown in FIG. 4(a) to FIG. 4(d) is input from the host computer in sequence and stored in the first page memory, each page data reduced to ¼ size is summarized and stored in the second page memory 24 as second page data for one page as shown in FIG. 6. Then, contents in the second page memory 24 are transferred to the printing unit 26 at S390, and the present flow ends. By this, page data for 4 pages are reduced ¼, respectively, and summarized into one page for printing. Also, in the reduction mode, in the case where data from no more than three pages are sent from the host computer, when the following control command is input from the host computer or the panel switch 20 of the printer, data which have been already stored in the second page memory 24 at that time is printed. When the mode change-over command in a mode other than the reduction mode is input, the process goes to S235 through processes at S30, S40, S60, S70, S75, and S80 in FIG. 2 and S205, S210 and S230 in FIG. 3. When it is determined at S235 that the change-over flag 16b has been set, the process goes to S390. Here, the contents stored in the second page memory 24 are printed. In other words, the contents for pages which have been already sent from the host computer are reduced to ¼ and printed as data for one page, and also when the end command is input, the process goes to S205 in FIG. 3 through processes at S30, S40, S60, S100, S105, and S110 in FIG. 2. Here, when it is determined that input data is the end command, the process goes to S390, and data stored at present in the second page memory 24 is printed in the same way as described above.

Since data transferred from the host computer to the present printer may be represented by character code data for characters and vector data for figures in the same way as in the standard mode even if the data is in the enlargement mode or the contraction mode, the data need not undergo special processing in the host computer for such enlargement editing or reduction editing. Accordingly, at S350 or S360, a printing output applied with enlargement editing or reduction editing can be obtained without imposing any burden on the host computer.

Further, the present invention is not limited to the above-mentioned embodiment. For example, the first page memory 22 and the second page memory 24 are constituted so that they store bit pattern data for one page, but their storage region may be constituted so as to store bit pattern data for a plurality of pages. Also, the above-mentioned character code data and vector data are stored in the first page memory 22 or the second page memory 24 as they are, and when data is transferred from the first page memory 22 to the second page memory 24 or when data is transferred from the second page memory 24 to the printing unit 26, the data may be developed into bit pattern data. Furthermore, the enlargement and reduction rates are not limited to 4 and ¼, they may be set at other values, for example 9 and 1/9, 16 and 1/16, and so forth, and the longitudinal and transversal enlargement and reduction rates may be 2 and ½, and at the same time, the length and breadth in the lengthwise direction may be reversed to make 2 and ½. In any case, the printing output applied with enlargement editing or reduction editing can be obtained without imposing any burden on the host computer.

What is claimed is:

1. A printer with an edit function comprising:
   an interface for receiving character data to be printed by the printer from a host data processing source in at least one of character code and vector form;
   developing means for developing the character data received by the interface into bit data;
   first storing means for receiving bit data in a plurality of successive data fields from the developing means and for storing the received bit data in said plurality of successive data fields in a manner defining a first character size, each data field representing a unit of data of a predetermined size;
   editing means for changing the size of characters defined by the bit data from the first storing means;
   second storing means for storing bit data edited by the editing means in a predetermined storage area;
   said editing means including means for reducing the bit data from the first storing means, means for dividing the predetermined storage area of the second storing means into a plurality of storage sections, means for designating each of the storage sections in a predetermined order, and means for supplying the designated storage sections of the second storing means with the bit data reduced by the reducing means, wherein the second storing means stores a plurality of the units of data for printing as a singular unit of output of a size substantially the same as said predetermined size; and means for printing in accordance with bit data stored in the second storing means.

2. Apparatus as in claim 1, wherein said editing means further includes means for designating said successive data fields in the first storing means in a predetermined order.

3. A printer as in claim 1, wherein the second storing means includes means for storing two or more pages of bit data from the first storing means as a single page of bit data to be printed by the printing means.

4. A printer as in claim 1, wherein said editing means includes means for removing every other bit from the input data in transverse and vertical directions of said data field.

5. A printer as in claim 1, wherein said editing means includes OR-operating means for performing an OR operation on plural adjacent bit data.

6. A printer as in claim 5, wherein the OR-operating means performs an OR operation on the bit data extending in a first direction and then performs an OR operation in a second direction orthogonal to the first direction on bit data resulting from the OR operation performed in the first direction.

7. A printer as in claim 1, wherein said first storing means stores the bit data with bits extending transversely and vertically in the data field, and
  wherein the editing means includes means for determining, from a group of adjacent bit locations extending by n bit locations in the lateral direction and n bit locations in the vertical direction, if bit data representative of printing exists in n or more of the bit locations in said group, where n is an integer equal to or greater than 2.

8. A printer with an edit function comprising:
  first storing means for storing input data in a manner defining a first character size from a host data processing source, and including means for storing the input data in a data field representing a unit of input data of a predetermined size;
  editing means for changing the size of characters defined by the input data from the first storing means;
  second storing means for storing data edited by the editing means;
  said editing means including enlarging means for enlarging the input data from the first storing means, means for dividing the input data from the first storing means into a plurality of data sections, first designating means for designating each of the data sections in a predetermined order, the data sections designated by the first designating means being enlarged by the enlarging means, wherein the second storing means stores a portion of the unit of input data for printing as a unit of output of a size substantially the same as said predetermined size; and
  means for printing the data sections stored in the second storing means.

9. A printer as in claim 8, wherein the second storing means includes means for storing a page of data from the first storing means as two or more pages of data to be printed by the printing means.

10. A printer as in claim 8, further comprising an interface for receiving character data to be printed by the printer from a host data processing source, said character data being in at least one of character code and vector form, and means for providing said character data to the first storing means.

11. A printer as in claim 10, further comprising developing means for developing said character data into bit data.

12. A printer as in claim 11, wherein the developing means provides said bit data to the second storing means.

13. A printer as in claim 8, wherein the first storing means stores the bit data in the transverse direction and the vertical direction; and
  wherein said editing means includes means for converting each bit of bit data in the first storing means to n bits of bit data in the transverse direction and n bits of bit data in the vertical direction, where n is an integer equal to or greater than 2.

14. A printer with an edit function comprising:
  an interface for receiving character data to be printed by the printer from a host data processing source in at least one of character code and vector form;
  developing means for developing the character data received by the interface into bit data;
  first storing means for receiving bit data in a plurality of successive data fields from the developing means and for storing the receiving bit data in a plurality of successive data fields in a manner defining a first character size, each of the data fields representing a unit of data of a predetermined size;
  editing means for changing the size of the character defined by the bit data from the first storing means;
  second storing means for storing bit data edited by the editing means in a predetermined storage area;
  said editing means including means for selectively reducing and enlarging the bit data from the first storing means, means for dividing bit data in the first storing means into a plurality of data sections when the bit data stored in the first storing means is to be enlarged; first means for designating each of the data sections in a predetermined order, means for dividing the predetermined storage area of the second storing means into a plurality of storage sections, second means for designating each of the storage sections in a predetermined order, and means for supplying the designated storage sections of the second storing means with one of a) a reduced bit data section and b) and enlarged bit data section, wherein the second storing means stores one of a) a plurality of one of said units of data and b) portions of one of said units of data, for printing as a singular unit of data of a size substantially the same as said predetermined size; and
  means for printing data in accordance with the bit data stored in the second storing means.

15. A printer as in claim 14, wherein the second storing means includes means for storing two or more pages of bit data from the first storing means as a single page of bit data to be printed by the printing means and for storing a single page of bit data from the first storing means as two or more pages of bit data to be printed by said printing means.

16. A printer as in claim 8, wherein said editing means includes means for removing every other bit from the input data in traverse and vertical directions of said data field.

17. A printer as in claim 8, wherein said editing means includes OR-operating means for performing an OR operation on plural adjacent bit data.

18. A printer as in claim 17, wherein the OR-operating means performs an OR operation on the bit data extending in a first direction and then performs an OR operation in a second direction orthogonal to the first direction on bit data resulting from the OR operation performed in the first direction.

* * * * *